United States Patent
Delaney et al.

(10) Patent No.: US 10,607,173 B2
(45) Date of Patent: Mar. 31, 2020

(54) COLLABORATION TRACKING SYSTEM

(71) Applicant: INTERNATIONAL BUSINESS MACHINES CORPORATION, Armonk, NY (US)

(72) Inventors: John V. Delaney, Kildalkey (IE); Dmitri Lerko, Balbriggan (IE); Francesco Mariani, Dublin (IE); David H. O'Grady, Maynooth (IE); Maeve M. O'Reilly, Rathdrum (IE); Clea A. Zolotow, Key West, FL (US)

(73) Assignee: International Business Machines Corporation, Armonk, NY (US)

( * ) Notice: Subject to any disclaimer, the term of this patent is extended or adjusted under 35 U.S.C. 154(b) by 909 days.

(21) Appl. No.: 15/166,343

(22) Filed: May 27, 2016

(65) Prior Publication Data

US 2017/0344915 A1    Nov. 30, 2017

(51) Int. Cl.
*G06Q 10/06*    (2012.01)
*G06F 17/30*    (2006.01)
(Continued)

(52) U.S. Cl.
CPC ....... *G06Q 10/0633* (2013.01); *G06Q 10/101* (2013.01); *H04W 4/021* (2013.01)

(58) Field of Classification Search
CPC .......... G06F 15/16; G06F 1/00; G06F 21/00; G06Q 10/00; G06Q 10/99; G06N 3/00; G06N 99/00; H04W 4/00; H04W 99/00
(Continued)

(56) References Cited

U.S. PATENT DOCUMENTS 7,493,369 B2 *   2/2009   Horvitz ............... G06Q 10/109
                                                        706/10
8,041,592 B2    10/2011   Lopez
(Continued)

FOREIGN PATENT DOCUMENTS

GB        2501471 A   * 10/2013
WO     2015029073        3/2015

OTHER PUBLICATIONS

Franco, L.. (2008). Facilitating Collaboration with Problem Structuring Methods: A Case Study of an Inter-Organisational Construction Partnership. Group Decision and Negotiation. 17. 267-286. 10.1007/s10726-007-9093-7. (Year: 2008)*
(Continued)

*Primary Examiner* — Alan S Miller
*Assistant Examiner* — Jay-Ming Wang
(74) *Attorney, Agent, or Firm* — Schmeiser, Olsen & Watts, LLP; Mark Vallone

(57) ABSTRACT

Computing systems, methods and collaboration tracking tools for predicting, tracking, and reporting the occurrence of unscheduled collaborations between two or more contributors to a project using computer systems equipped capabilities to transmit and/or receive location information of each individual contributor. An analytics module receiving the location information may use the location data to identify when two or more contributors to a project are in the same location together, and further predict whether the proximity of location and timing of the contributors crossing paths will predictably lead to an undocumented project-related collaboration determined as a function of location information, historical data and input collected. The collaboration tracking tools predict, report and/or record collaborations of project-related topics. Collaboration tracking tools confirm discussion of project-related topics, report to project managers for the purpose of updating the project (Continued)

managers and provide the project team with a copy of the recorded collaboration.

20 Claims, 8 Drawing Sheets

(51) Int. Cl.
*G06N 7/00* (2006.01)
*H04W 4/02* (2018.01)
*G06Q 10/10* (2012.01)
*H04W 4/021* (2018.01)

(58) Field of Classification Search
USPC .................................................. 705/7.11, 7.42
See application file for complete search history.

(56) References Cited

U.S. PATENT DOCUMENTS

| | | | |
|---|---|---|---|
| 2005/0021485 A1* | 1/2005 | Nodelman | G06Q 10/109 706/21 |
| 2006/0281469 A1 | 12/2006 | Stoller et al. | |
| 2012/0137201 A1* | 5/2012 | White | G06F 16/957 715/205 |
| 2014/0357295 A1* | 12/2014 | Skomra | G06Q 10/08 455/456.1 |
| 2015/0081487 A1 | 3/2015 | Porter et al. | |
| 2015/0327011 A1 | 11/2015 | Fairbanks | |

OTHER PUBLICATIONS

Turner, Rhonda; Employee Monitoring: An essential component of your risk management strategy; Deep software Inc. White Paper; URL: https://www.softactivity.com/employee-monitoring-softactivity.pdf; retrieved from the Internet Feb. 25, 2016; 6 pages.
Lee, Joel; 4 Excellent Free Time Tracking Tools [Android]; retrieved from the Internet Feb. 25, 2016; URL: http://www.makeuseof.com/tag/4-excellent-free-time-tracking-tools-android/; 1 page.
Vanderkam, Laura; 10 Time-Tracking Apps That Will Make You More Productive in 2014; retrieved from the Internet Feb. 25, 2016; URL: http://www.fastcompany.com/3024249/10-time-tracking-apps-that-will- . . . ; 6 pages.
Tilbury, Chad; Big Brother Forensics: Device Tracking Using Brower-Based Artifacts (Part 2); SANS Digital Forensics and Incident Response Blog; retrieved from the Internet Feb. 25, 2016 (posted Apr. 11, 2012); URL: https://digital-forensics.sans.org/blog/2012/04/11/big-brother-forensics-device-tracking-using-browser-based-artifacts-part-2; 6 pages.

* cited by examiner

COLLABORATION TRACKING SYSTEM

TECHNICAL FIELD

The present disclosure relates generally to monitoring tools and methods for tracking, monitoring and predicting interactions between collaborating users.

BACKGROUND

In certain environments that include collaboration amongst contributors to a project, one or more collaborators may gather together at one or more particular locations or common areas. These physical gatherings of contributors may be planned in some instances, while in other instances; the gatherings may be more impromptu or spontaneous. Crossing paths with fellow contributors may lead to a spontaneous discussion about project and non-project related topics. In some instances an impromptu gathering may begin as a less informal discussion about non-project related topics and slowly morph into a topic that may be relevant to the project being collaborated on between one or more contributors.

Currently, it is not possible to automatically identify or predict when a casual or unscheduled encounter between one or more contributors collaborating on a project may actually be directed to a project-related topic. Often, these informal and/or unplanned discussions go unrecorded, unidentified and/or unnoticed by project managers in charge of the contributors or the rest of the project team. The current technologies available are unable to predict, capture, record and/or automatically report these productive, yet spontaneous discussions, thus depriving contributors of the recognition they deserve by project managers and the rest of the project team, when contributors participate in these impromptu collaboration discussions.

SUMMARY

A first embodiment of the present disclosure provides a method for tracking undocumented collaboration between contributors of a project comprising the steps of: receiving, by a computer processor, location data from a location sensor, the location data including location information of a plurality of project-associated computing systems communicating with the location sensor; compiling, by the computer processor, contributor input data stored by one or more data sources receiving the input data via an input/output (I/O) interface; comparing, by the computer processor, the location data and contributor input data of each of the plurality of project-associated computing systems communicating with the location sensor; generating, by the computer processor, a probability that a plurality of contributors associated with each respective project-associated computing systems, are discussing a project-related topic, the probability being generated as a function of each contributor's location data and contributor input data; and reporting, by the computer processor, the undocumented collaboration between contributors of the project as a function of the probability.

A second embodiment of the present disclosure provides a computer program product, comprising one or more computer readable hardware storage devices having computer readable program code stored therein, said program code containing instructions executable by the one or more computer processors for tracking undocumented collaboration by contributors to a project comprising the steps of: receiving, by a computer processor, location data from a location sensor, the location data including location information of a plurality of project-associated computing systems communicating with the location sensor; compiling, by the computer processor, contributor input data stored by one or more data sources receiving the input data via an input/output (I/O) interface; comparing, by the computer processor, the location data and contributor input data of each of the plurality of project-associated computing systems communicating with the location sensor; generating, by the computer processor, a probability that a plurality of contributors associated with each respective project-associated computing systems, are discussing a project-related topic, the probability being generated as a function of each contributor's location data and contributor input data; and reporting, by the computer processor, the undocumented collaboration between contributors of the project as a function of the probability.

A third embodiment of the present disclosure provides a computer system, comprising a processor; a memory device coupled to the processor; and a computer readable storage device coupled to the processor, wherein the storage device contains program code executable by the processor via the memory device to implement a method for tracking undocumented collaboration between contributors to a project comprising the steps of: receiving, by a computer processor, location data from a location sensor, the location data including location information of a plurality of project-associated computing systems communicating with the location sensor; compiling, by the computer processor, contributor input data stored by one or more data sources receiving the input data via an input/output (I/O) interface; comparing, by the computer processor, the location data and contributor input data of each of the plurality of project-associated computing systems communicating with the location sensor; generating, by the computer processor, a probability that a plurality of contributors associated with each respective project-associated computing systems, are discussing a project-related topic, the probability being generated as a function of each contributor's location data and contributor input data; and reporting, by the computer processor, the undocumented collaboration between contributors of the project as a function of the probability.

DETAILED DESCRIPTION

Overview

Figure 1:
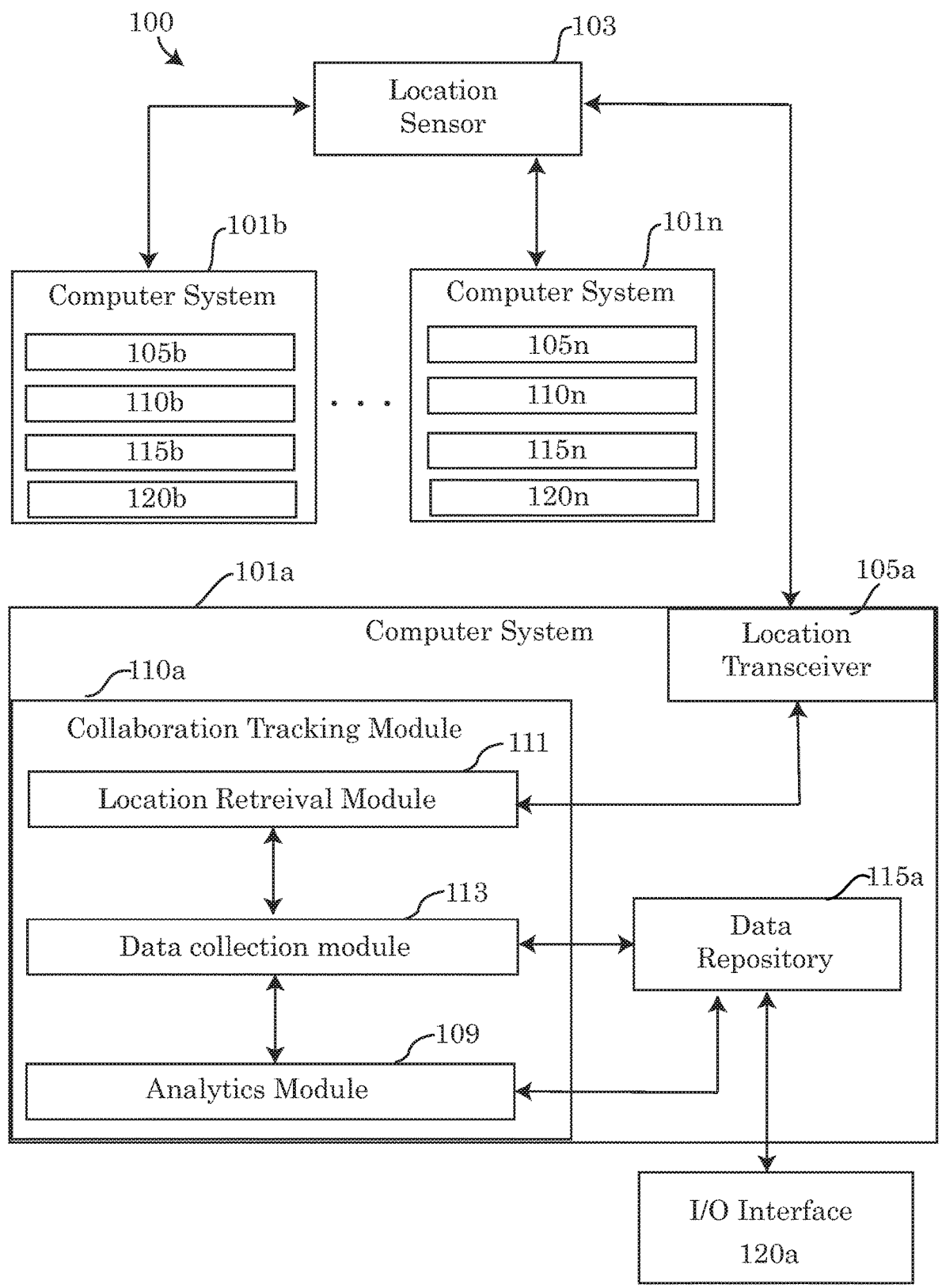
FIG. 1 depicts a block diagram of an embodiment of a computer system capable of implementing collaboration tracking tools, methods and systems consistent with embodiments of the present disclosure.

Embodiments of the present disclosure provide for tools, methods and systems for tracking and/or reporting meetings, discussions and collaborations which may occur between one or more individuals, such as contributors to a project. In particular, the tools, methods and systems provided in this disclosure may be useful for tracking and reporting informal, spontaneous or impromptu meetings and other collaborations between contributors or users, which may be unscheduled or unplanned. Moreover, the tools, methods and systems described by this disclosure may predict, record and report the occurrence or content of the unscheduled collaborations, even under circumstances where collaborations occur face to face between fellow contributors (i.e. a non-computing based environment).

The embodiments of the collaboration tracking tools, methods and systems may predict, track, and report the unscheduled collaborations using one or more computing devices equipped with hardware and/or software capable of transmitting and/or receiving location information of the each individual, user or contributor. Location information may be further used in conjunction with information or data collected from network accessible data sources and input data from the contributors into a computer system, to predict the occurrence of unscheduled, project-related collaborations. An analytics system receiving the location information may use the location data to identify when two or more contributors of a project are in the same location together, and further predict whether the proximity of location and timing of the contributors crossing paths led to a project-related collaboration based on the information collected from the network accessible data sources.

In some embodiments, the collaboration tracking tools may not only predict and report unscheduled collaborations directed toward a project-related topic, but may also use the predictions surmised by the collaboration tools and systems to record the collaboration at the location of the interaction, confirm project-related topics were discussed, report the collaboration to a project-manager and the remainder of the project team for the purposes of attributing credit to the contributor and further provide the project team with a copy of the recorded collaboration, further enhancing collaboration amongst the entire project team.

The collaboration tracking tools and systems described herein may be a network of physical devices, objects, hardware and/or software which may be embedded with electronic circuits, software, location sensors, location emitting transmitters, receivers, transponders or transceivers, and network connectivity capabilities, which may allow for the hardware and software-enabled devices or objects of the collaboration tracking network to collect and exchange location data, input data and historical data about contributors or other participating individuals' or users' information, collected from network accessible data sources.

System for Tracking Undocumented Collaboration

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Referring to the drawings, FIG. 1 depicts a block diagram illustrating an embodiment of a system 100 for tracking spontaneous, unscheduled, and/or undocumented collaboration between one or more contributors to a project, including individuals, users or groups of users that may form a project team (hereinafter, "contributors"). The system 100 may include one or more computer systems 101a, 101b . . . 101n (referred to collectively as computer systems 101), wherein the number of computer systems 101 present in the system 100 may vary from embodiment to embodiment. The reference numbers with sub-letters and ellipses, such as 101a, 101b . . . 101n, signifies that the embodiments are not limited to only to the amount of elements actually shown in the drawings, but rather, the ellipses between the letters and the $n^{th}$ element indicate a variable number of similar elements of a similar type. For instance, the computing systems 101, any number of computing systems 101 may be present, computer system 101a, computer system 101b and a plurality of computer systems up to the $n^{th}$ number of computer systems, wherein the variable "n" may represent the last element in a sequence of similar elements shown in the drawing.

A limitation on the number of computing systems 101 may occur in some embodiments, but such a limitation may be imposed as part of the system 100's physical hardware or software limitations to support only a certain number of computer systems 101 as part of system 100 or limited by the number of computer systems 101 that are currently being utilized or connected to the collaboration tracking system 100. For example, in some embodiments, each contributor being tracked by the tracking system 100 may be tied to one of each of the computing system 101. Under such circumstances, the number of computing systems in system 100 may be equal to the number of contributors that are currently tied to each of the computer systems 101. In other embodiments, a contributor may correlate a computing system 101 to their location by entering credentials, such as a user name and password, allowing the contributor to log into the computing system and/or access the collaboration tracking tools.

In some embodiments, the computer systems 101 of the collaboration tracking system 100 may include a location transceiver 105a, 105b . . . 105c (referred to collectively as location transceiver 105). The location transceiver 105 may include hardware and/or software based transceivers capable of transmitting location data of the computer systems 101

(and thus the location of the contributors) to a location sensor 103, as well as receives location data from the location sensor 103 and/or other location data transmitted by other computing systems 101. Embodiments of a location transceiver 105 may include transceivers, transmitters, receivers or transponders capable of sending and/or receiving data signals such as global positioning system (GPS), Bluetooth, infrared, light emitting device or light-emitting diode (LED), Wi-Fi or a radio frequency (RF) such as RFID.

The location sensor 103 may be any type of hardware, software or combination of hardware and software components that are capable of sending, receiving and identifying information about the location of each of the contributors' computer systems 101 that may be within the proximity of the location sensor 103. The sensor may be built into a computer system, such as computer system 101, or the location sensor 103 may be its own separate computer system having the components of computer system 800 integrated with a location sensor 103 as an input or output device, independent of computer systems 101, capable of being connected through wires or wirelessly depending on the location transceiver 105 equipped in the computer system 101. Examples of location sensors 103 may include GPS satellite systems, Bluetooth beacons, Wi-Fi beacons, RFID tags, light sensors or infrared sensors. A computer system 101 and location sensor 103 may include in some embodiments, a single type of location sensor 103 and a single transceiver 105 that are each capable of sending and receiving signals to one another. In alternative embodiments, the computer systems 101 may be equipped with a plurality of different types of transceivers 105 in order to ensure that the computer system may be equipped with proper hardware and/or software to interface properly with the location sensor 103 installed at a particular location being tracked.

In some embodiments, the location data of the location sensor 103 may be stored or saved locally to a memory storage device of the location sensor 103, which may be equipped with a volatile or non-volatile memory device such as flash based memory, NAND, RAM, a hard drive, solid state drive, etc. In other embodiments, such as the system 300 of FIG. 3, the location sensor 303*a* . . . 303*n* (referred collectively as location sensor 303) may store or backup the location data to a network repository 325, which may be accessible to each computer system 301*a*, 301*b* . . . 301*n* (collectively referred to as computer system 301) connected to the network 307.

Embodiments of location data may comprise identifying information about the location sensor 103, such as a sensor name, the location of the sensor which may be descriptive location (e.g. coffee shop, home address, library, office, etc.), GPS location with longitude and latitude coordinates, or an address written similar to a mailing address. Location information may also include identifying information about the computer systems 101 connecting the location sensor 103, including computer name, IP address, MAC address, the contributor registered to the computer system 101, the time the computer entered the proximity of the location sensor 103 and the time the computer system 101 was no longer within the proximity of the location sensor 103. As noted above, in some embodiments, the location sensor 103 may actually be a GPS satellite. Under such a circumstance where a GPS satellite is monitoring the GPS or geolocation of each contributor via the contributors' associated computer systems 101, the time of being within or outside of the location sensor's 103 proximity may not be possible to determine because the GPS location may be always accessible. Instead the GPS satellite may consistently transmit location data having location and time information to the computer systems 101 or periodically update the GPS location of computer systems 101 connected to the location sensor 103.

In some embodiments, the location sensor 103 and/or computer system 101 may include recording hardware and/or software for capturing and recording conversations and video of collaborating contributors of a project. The location sensor 103 and/or computer system 101 may be equipped with video recording devices, microphones and/or image capturing software to further collect information about the collaborations that may occur within the proximity of a location sensor 103 or computer system.

Embodiments of computer systems 101 may include one or more modules for tracking collaborations between contributors. A module may be refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of a computer system 101. A module (whether hardware, software, or a combination thereof) may be designed to implement or execute one or more particular functions or routines. The collaboration tracking system 100, may include a collaboration tracking module 110*a*, 110*b* . . . 110*n* (collectively referred to as tracking module 110). In the computer systems 101, the collaboration tracking module 110 may include one or more components of hardware and/or software program code for receiving, analyzing, interpreting and reporting data collected from the location sensors 103 in the form of location data and separately, input data provided by one or more contributors via I/O interface 120*a*, 120*b* . . . 120*n* (collectively referred to as I/O interface 120) and historical data, which may be stored in one or more data source accessible by the computer system 101. The I/O interface 120 may provide a way for contributors and/or users of the computer system 101 to interact with the computer system 101, the computer system's hardware or software programs. The I/O interface 120 may allow for the interactions by the contributors (or other user) to be encoded or decoded as a signal understandable by input devices or output devices and transmitted to the computing system 101.

In some embodiments of the collaboration tracking system 100, the collaboration tracking module 110 may include a plurality of modules integrated therein, wherein each module may be specifically tasked with performing one or more functions of the collaboration tracking module 110. For example, in the embodiment depicted in system 100, the collaboration tracking module 110 may include an analytics module 109, a location retrieval module 111 and a data collection module 113. A location retrieval module 11 may refer to one or more components of hardware, a software program loaded in the memory of the computer system 101 or a combination thereof, integrated with or capable of, retrieving location data received by the location transceiver 105. In some embodiments, the location retrieval module may be equipped with hardware or software capabilities that allow for decoding or decrypting the location data from the electromagnetic signal used to transmit the data over the distance between the location sensor 103 or other computing systems 101.

Embodiments of the location retrieval model 111 may follow one or more protocols established by individuals skilled in the art to decode or decrypt the location data received by the location transceiver 105, into a format accessible or understandable by the computing system 101 for storage in a data repository 115a, 115b . . . 115n (collectively referred to as data repository 115) and for further analysis by analytics module 109. Conversely, the location retrieval module 111 may also encrypt or encode location data stored by the computer system 101 prior to transmission of the location data to the location sensor 103 of the collaboration tracking system 100, which may be decoded by the other computer systems and/or location sensor 103 receiving the transmitted location data.

In some embodiments, the collaboration tracking module 110 may include an analytics module 109. Embodiments of the analytics module 109 may refer to configurations of hardware, software program code, or combinations of hardware and software programs, capable of receiving location data from the location sensor 103 and/or location retrieval module 111, input data received via I/O interface 120 and historical data accessible to the computer system 101 via locally stored or a network of accessible data sources. The analytics module 109 may perform analytical calculations allowing for the computer system 101 to make optimal, realistic decisions and collaboration predictions based on the existing location data, input data and historical data of contributors. Embodiments of the analytics module 109 may apply organizational techniques to the data using a combination of statistical techniques, qualitative analysis and computer programming. Through the analysis of data, the analytics module 111 may discover, identify and interpret meaningful patterns in the behavior of the contributors being tracked by the collaboration system 100.

Historical data sources and data sources saving the input/output data of contributors or other users using the computer systems 101 may be considered particularly useful for identifying patterns that may predict the occurrence of unscheduled collaborations between contributors which lead to discussion of project related topics. A data source may refer to any physical or digital location where data may come from, such as a database, dataset, spreadsheet and even hard coded data. Data sources that may be reviewed for useful patterns in conjunction with the location data may include: social media feeds and other web page activity, web browser history, messaging services, search queries, such as search engine or keyword searches, keystroke loggers, email services, network logs, data logs, any other data source known by a person skilled in the art.

In some embodiments of system 100, the collaboration tracking module 110 may include a data collection module 113a, 113b . . . 113n (referred to collectively as data collection module 113). The data collection module 113 may be hardware components, software program code or a combination thereof, configured as part of the computer system 101, which may act as a collection point for aggregating location data from the location retrieval module 111, as well as input data and historical data stored by the data repository 115. The data collection module 113 may gather the data information from each of the variety of sources in order to form a more complete and accurate picture of the collaboration between contributors, prior to transmitting the collected data to the analytics module 113 for pattern recognition and analysis. In some embodiments, the data collection module 113 and the analytics module 109 may be a single, combined component and/or program, or in other embodiments, such as the embodiment shown in FIG. 1, the data collection module 113 and the analytics module 109 may be separate and distinct components or programs communicating with one another.

Figure 2:
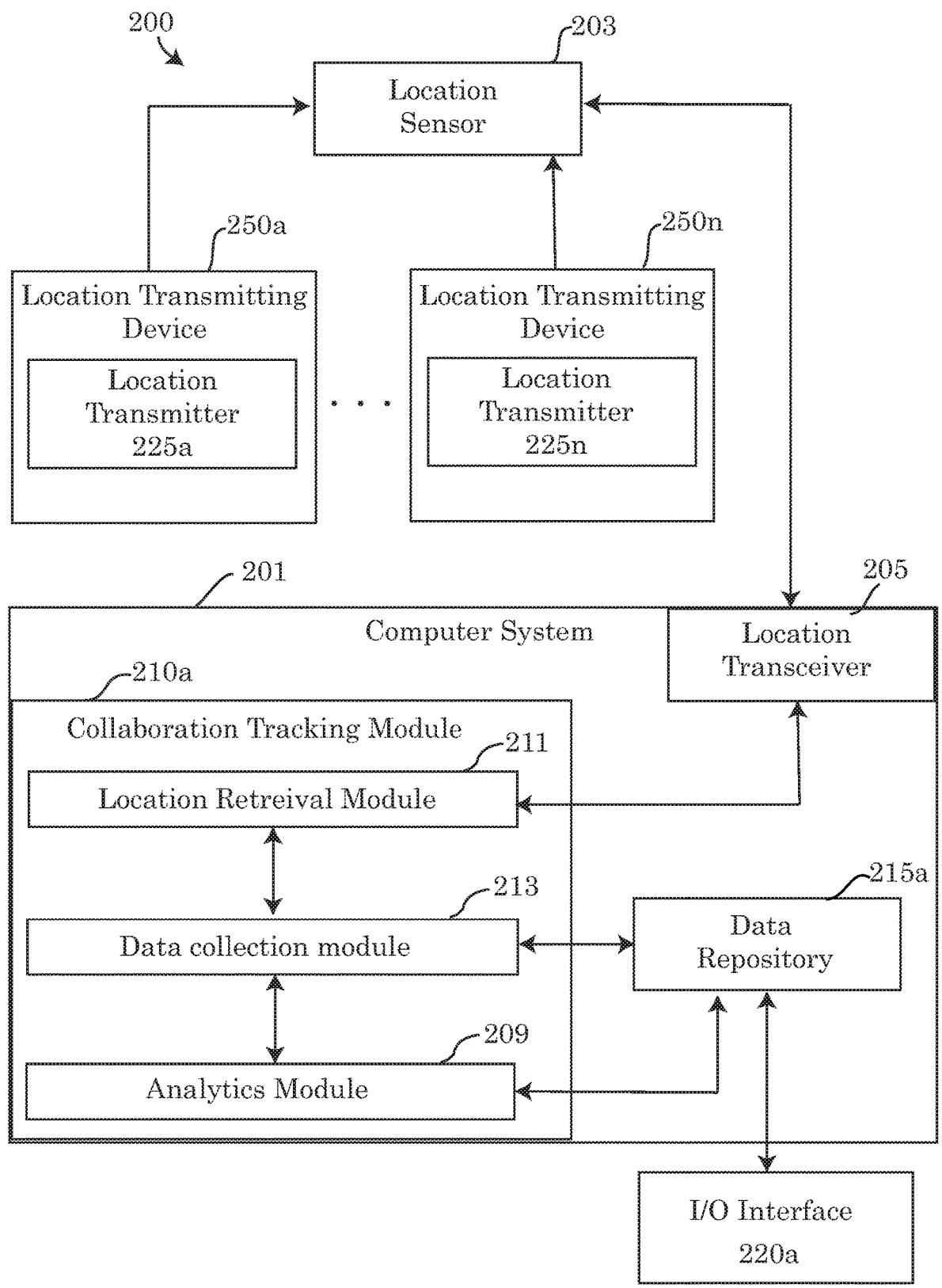
FIG. 2 depicts a block diagram of an alternative embodiment of a computer system capable of implementing collaboration tracking tools, methods and systems consistent with embodiments of the present disclosure.

Referring to FIG. 2, collaboration tracking system 200 describes an embodiment of a collaboration tracking system wherein one or more of the computer systems are location transmitting devices 250a . . . 250n (collectively referred to as location transmitting devices 250). The location transmitting devices 250 may, in some embodiments, be a more transportable computing system that may or may not include each of the elements of the computer system 101 or computer system 201. In some embodiments, the location transmitting devices 250 may have a more limited purpose of transmitting location data via location transmitter 225a . . . 225n (collectively referred to as location transmitter 225) from each of the location devices 250 to the location sensor 203. In some embodiments, the location transmitting device 250 may not be equipped with each of the more specialized hardware or software such as the collaboration tracking module 210. Instead of relying on each computer system 101 to receive location data from each of the other computer systems and/or sensor 103, as shown in the system 100 of FIG. 1, in system 200, a central computing system 201 or a plurality of computer systems 201 may collect and process the location data received and transmitted by sensor 203 to the location transceiver 205.

The computer systems 201 may be individual computer systems or workstations belonging to one or more contributors, project specific computer systems or a centralized computing system such as a physical or virtual server. Using the collection of location data transmitted by the sensor 203, computer system 201 may utilize the collaboration tracking module 210, and one or more modules 209, 211, 213, input data from I/O interface 220 and a network of data sources to analyze and predict project-related collaborations between contributors and members of the project team.

Embodiments of the location transmitting devices 250 may be similar to the location transceiver 105, 205, described above, except that the location transmitters 250 may only transmit location data to a location sensor 203 or the location transceiver 205 of computer system 201. The location transmitter 250 may not be able to receive location data from the location sensor 203. However, in some embodiments, the location transmitter 250 may be a location transceiver or transponder, rather than only a transmitter. Embodiments of the location transmitter 250 may include GPS antennas, Bluetooth antennas, and light based transmitters such as a light emitting device or LED, Wi-Fi antenna, RFID or any other known transmitting device capable of sending a signal to a sensor. As noted above, one advantage of using a location transmitting device as the computer system may be due to reduced complexity and size. For instance, the location transmitting device 250 may be incorporated into portable computing systems or integrated into specific items such as an ID card, writing utensil, key fob, badge, remote control or other device capable of transmitting location data.

Similar to the computer systems 101 of FIG. 1, a location transmitting device 250 entering within the proximity of a location sensor 203, may emit a signal identifying the location device 250 to the location sensor 203, wherein said location sensor is receiving location data transmitted by the signal. The location data transmitted to the location sensor 203 may include identifying information such as the name of the location transmitting device, IP address, MAC address, serial number, the contributor registered to the location transmitting device 250, the time the location transmitting device 250 entered the proximity of the location sensor 203 and the time the location transmitting device was no longer propagating the transmission signal within the proximity of the location sensor 203. The location sensor 203 receiving the location data may transmit the location data, along with information identifying the location sensor's 203 position to one or more computing systems 201 or to the location transceiver 205 for analysis and storage by computer system 201, in the manner previously described consistent with system 100 of FIG. 1.

Figure 3:
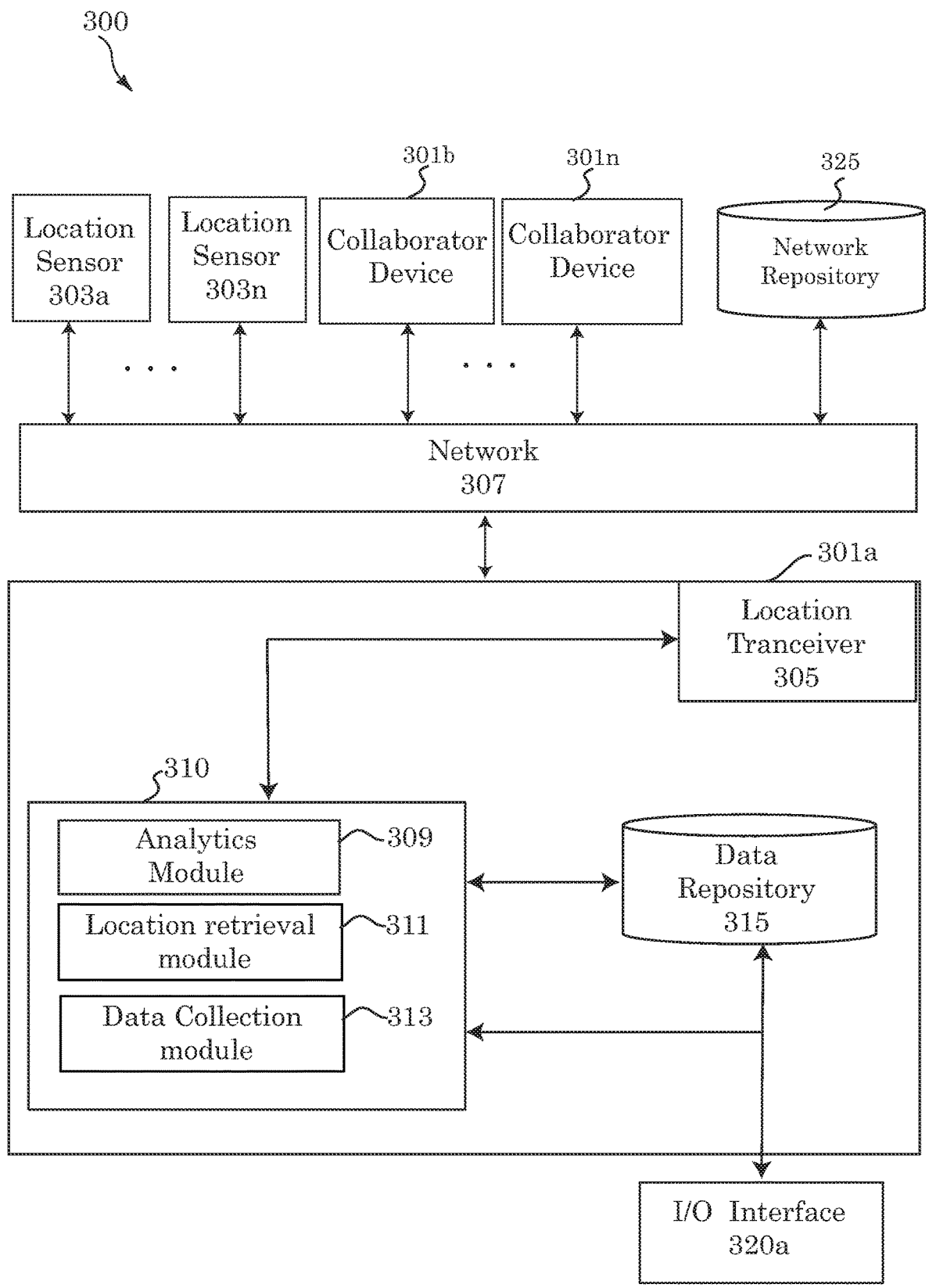
FIG. 3 depicts a block diagram of an embodiment of computing system network capable of implementing collaboration tracking tools, methods and systems consistent with embodiments of the present disclosure.

Referring to the embodiment of the collaboration tracking system 300 of FIG. 3, in some embodiments, such as those previously described, the hardware and software forming the collaboration tracking systems may be connected and communicate through a centralized network 307. A network 307 may refer to a group of two or more computer systems linked together. Network 307 may be any type of computer network known by individuals skilled in the art. Examples of computer networks 307 may include local area networks (LAN), wide area networks (WAN), campus area networks (CAN), home area networks (HAN), metropolitan area networks (MAN) or an enterprise network. The architecture of the computer network 307 may be a peer to peer network in some embodiments, wherein in other embodiments, the network 307 may be organized as a client/server architecture. In some embodiments, the computer systems 301, location sensors 303, network repositories 325 or other systems connected to the network 307 may be considered nodes of the network 307. In some embodiments, where the computing systems 301, location sensors 303 or network repositories 325 allocate resources to be used by the other nodes of the network 307, those nodes may be referred to as servers.

Although collaboration system 300 may include analogous computer systems and devices, such as computer systems 301a, 301b . . . 301n and location sensor 301a, 301b . . . 301n, embodiments of the collaboration system 300 may operate differently over the network. For example, in some embodiments, system 300 location sensors 303 may transmit and receive location data between each of the computer systems 301 by directly transmitting computer signals from transmitter to receiver (or transceiver), similar to FIG. 1 and FIG. 2. In other embodiments, the network 307 may control and direct the flow of location data over the network 307, back and forth between the nodes of the system 300. For instance, through the network's 307 protocols, rules and procedures may be established for directing the flow of information data, historical data and contributor input between location sensors 303, computer devices 301, data sources, and the network repositories 325.

In some alternative embodiments, the flow of data may not be direct between each of the nodes of the network. Instead, each node of the network 307 may send and receive location data, historical data or other types of data to a network repository 325 which may store the information and allow other nodes of the networks to retrieve the location data, historical data, input data or any other type of data generated through the system 300 by requesting the data from the network repository 325.

Figure 4:
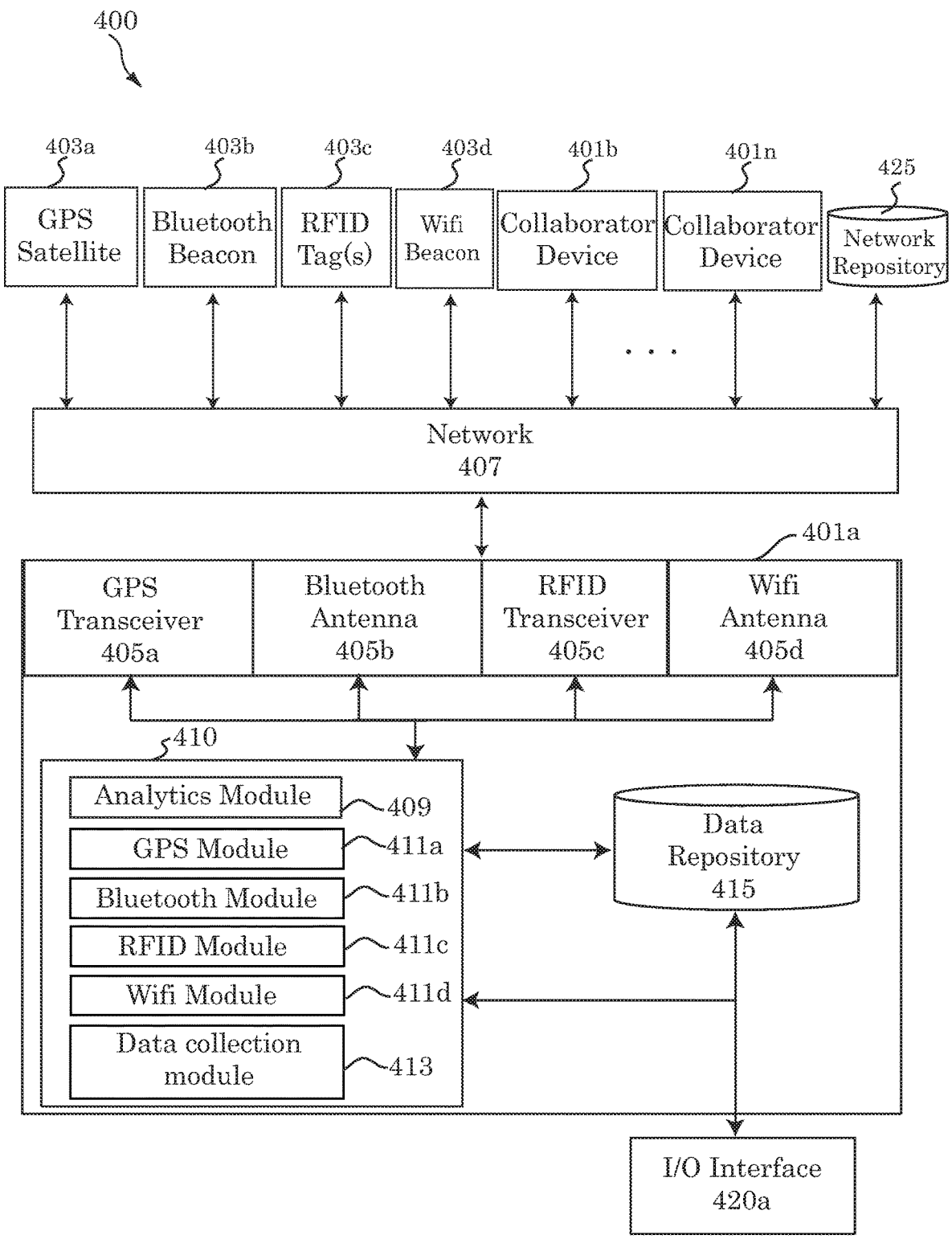
FIG. 4 depicts a block diagram of an alternative embodiment of a computer system network capable of implementing collaboration tracking tools, methods and systems consistent with embodiments of the present disclosure.

Referring to the drawings of FIG. 4, the exemplary embodiment of collaboration tracking system 400 describes a more specific configuration than the collaboration systems 100, 200, 300 previously described above. As shown in the exemplary embodiment of system 400, one or more specific location sensors 403a, 403b, 403c, 403d (collectively referred to as location sensors 403) may be present as one or more nodes connected to network 407. Conversely, each of the computer systems 401a, 401b . . . 401n (collectively computer systems 401) may include a plurality specific location transceivers 405a, 405b, 405c, 405d (collectively location transceivers 405), transmitters or transponders, which may communicate directly or via the network 407 with one or more of the location sensors 403.

As shown in system 400, embodiments of location sensor 403 may include a GPS satellite 403a, Bluetooth beacon 403b, RFID tag(s) 403c or a Wi-Fi beacon 403d. Respectively, each computer system 401 may be equipped with a transmitter, receiver, transceiver or transponder capable of transmitting and receiving signals either directly with the location sensor 403 or via the network 407. For example, in some embodiments, the computer system 401 may include a GPS transceiver 405a, which may be designed to communication by sending and receiving GPS based location data with the GPS satellite 403a location sensor. In other embodiments of system 400, the location data of the location sensor may be communicated over Bluetooth, by using a Bluetooth beacon 403b. Likewise, because location data may be sent via a Bluetooth signal, the computer system 401 may be equipped with a Bluetooth antenna 405b, capable of sending and receiving data between the Bluetooth antenna 405b and the Bluetooth beacon 403b connected to network 407. In yet another alternative embodiment, the location data may be communicated over the network 407 or directly with the location transceivers of the computer systems 401 using RFID or Wi-Fi. Similar to the embodiments using a GPS satellite 403a/GPS transceiver 405a or a Bluetooth beacon 403b/Bluetooth antenna 405b, each of the computer systems 401 may be equipped with RFID transceiver to communicate with RFID tags 403c or a Wi-Fi antenna 405d to communicate location data between the Wi-Fi beacon 403d.

In some embodiments of the system 400, the location retrieval module 111, 211, 311 that may be present as part of the collaboration tracking module 410, may be designed or equipped with specific hardware, specialized circuitry or program software capabilities for transmitting, receiving, encoding and decoding location data from particular location data sources. For example, in one embodiments, a GPS module 411a may be configured as part of the collaboration tracking system 400, for the purpose sending, receiving, encoding and decoding GPS satellite 403a signals for the computer system 401, whereas a Bluetooth module 411b may integrated as hardware and/or software of the computer system 401 for the purpose of sending, receiving, encoding and decoding Bluetooth signals carrying location data of the Bluetooth beacon 403b. In other embodiments, the location retrieval module may be specifically designed or programmed for sending, receiving, encoding or decoding location data transmitted as an RFID signal or Wi-Fi signal. In those embodiments, an RFID 411c module may be incorporated into the collaboration tracking module 410 when RFID tags 403c are acting as location sensors and a Wi-Fi module 411d may be part of the computer system 401, when a Wi-Fi beacon 403d is acting as a location sensor.

Similar to FIG. 1, the location information being received by the specific location transceivers 405 may be sent for further processing and decoding by the respective location retrieval modules 411a, 411b, 411c, 411d. Subsequently, the specific location retrieval modules may transfer the location data to a data collection module 413 which may aggregate the location data, historical data and input data and store each of the data types in the data repository 415 and/or network repository 425. The data collection module may send the collected data aggregated by the data collection module 413 to the analytics module 409 in a manner similar to that described above in the embodiment of system 100.

Figure 5:
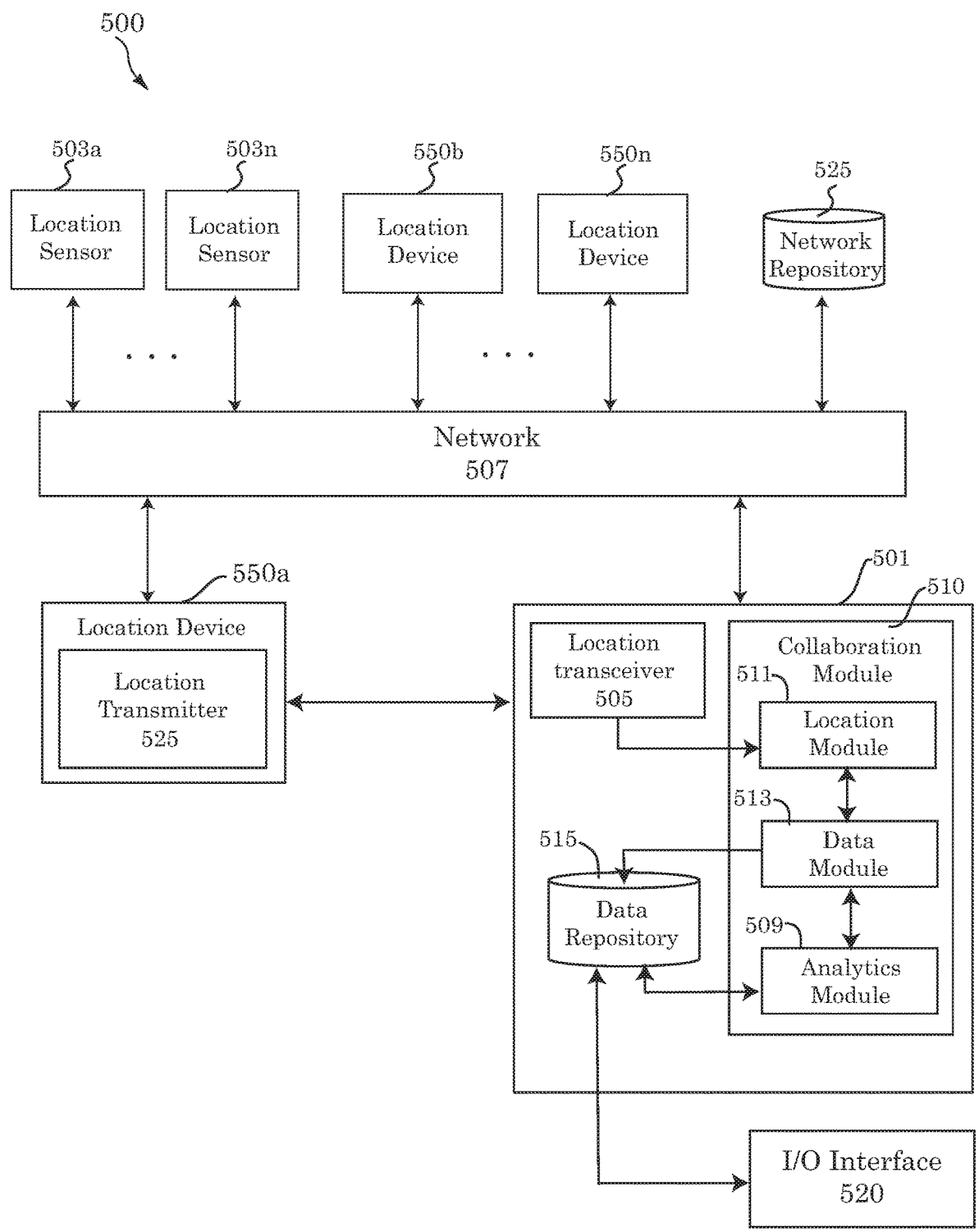
FIG. 5 depicts a block diagram of another alternative embodiment of a computer system network capable of implementing collaboration tracking tools, methods and systems consistent with embodiments of the present disclosure.

Referring to FIG. 5, the alternative embodiment disclosed by collaboration tracking system 500 may be considered a hybrid variation of system 200 and system 300. Similar to system 200 described above, the location data of each contributor or project team member being tracked by system 500 may be transmitted to the one or more location sensors 503a . . . 503n (collectively location sensors 503) via a location transmitting device 550a, 550b . . . 550n (collectively location transmitting devices 550). Each of the location transmitting devices of the system 500 may be equipped with a location transmitter 505 which may be similar to the location transmitter 225 as described above. In some embodiments, the location transmitting devices 550 transmit the location of the location transmitting device 550, and thus the location of the contributor directly to the location sensor 503 which is in proximity to the area or range of the location transmitting device 550.

In other embodiments, the location transmitting device 550 may connect to the network 507 and transmit location data via network 507 to either the location sensor 503 and/or the network repository 525. In some embodiments, the location transmitter may remotely synchronize directly or via the network 507 to a centralized computing system 501 or workstation. In alternative embodiments, the location sensors 503 may transmit location data stored by the location sensors 503 describing each of the transmissions of the plurality of location transmitting devices, to the network repository. A computer system 501 may connect to the network repository to automatically or periodically download location data stored by network 507. In an alternative embodiment, the location sensors 503 may transmit the location data received from the location devices 550 over the network 507 to the location transceiver 505 of computer system 501. Computer system 501 may receive, store, encode, decode, analyze and use the location data to draw conclusions about each contributors' collaboration patterns in the manner as previously described by systems 100, 200, 300 and 400 in accordance with FIGS. 1-4 above, wherein the location transceiver 505, collaboration module 510, location module 511, data collection module 513, analytics module 509, data repository 515 and I/O interface 520 are analogous in composition and function to the similarly named counterparts in FIGS. 1-4 as described above.

Method for Tracking Undocumented Collaboration

Figure 6:
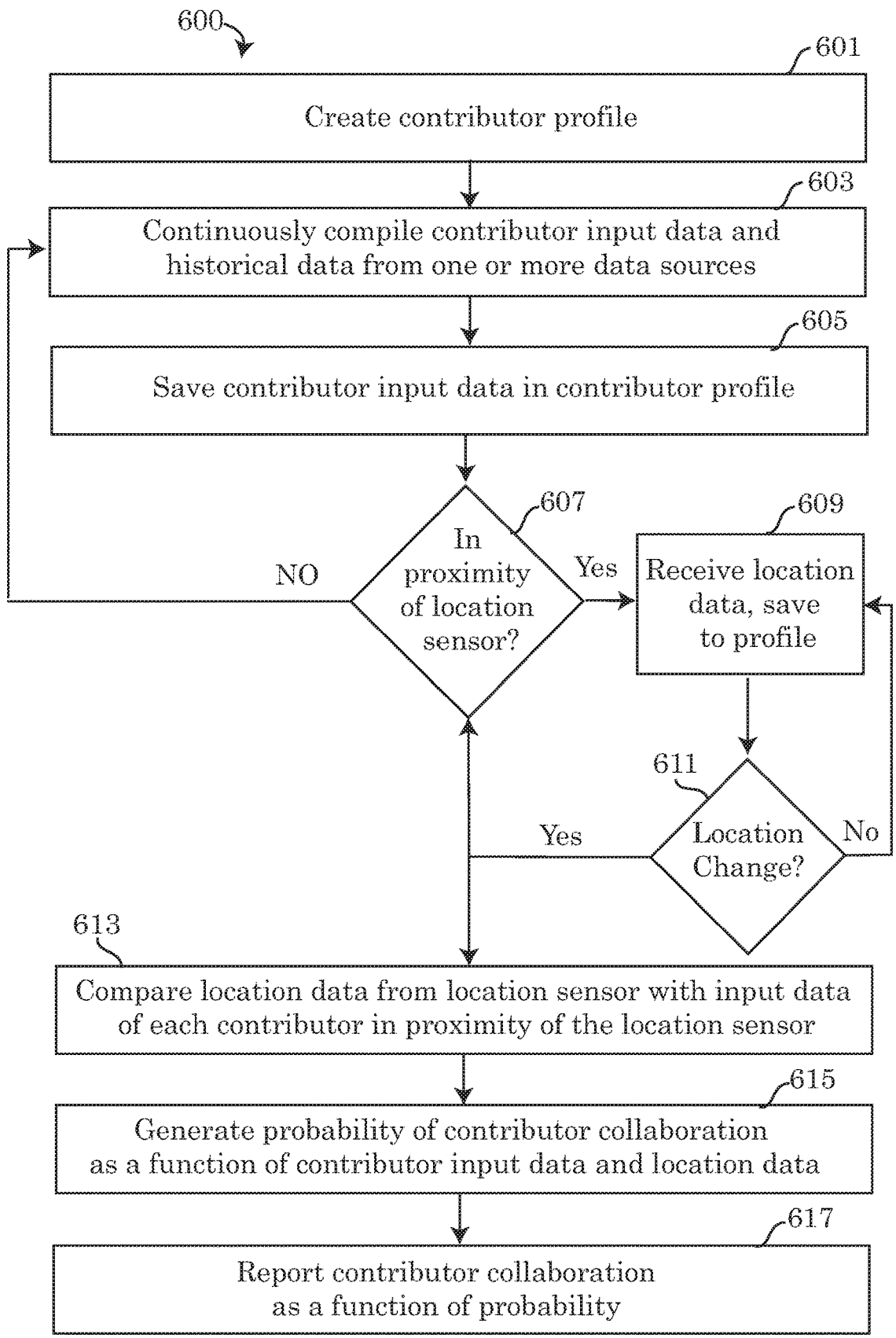
FIG. 6 depicts a flowchart of an embodiment of an algorithm capable of implementing methods of tracking undocumented collaborations between contributors of a project consistent with embodiments of the present disclosure.

Referring to FIG. 6 depicting a flowchart of a method 600 for tracking and reporting collaboration between contributors of a project using the embodiments of the collaboration tracking systems described above and depicted by FIG. 1 to FIG. 5. Step 601 of the method 600 may include a step of creating a contributor profile. Information about each contributor may be stored as part of the contributor profile created in step 601, including location data tracking each location a contributor may be in relation to each of the location sensors 103, historical data collected by computer system 101 either locally or via network accessible data sources and input data entered into the computer system via an input or output device connected to I/O interface 120. In some embodiments, the information about each contributor connected to each specific contributor profile created in step 601 may be voluntarily inputted by the contributor during the creation process of step 601. For example, a contributor or other member of the project team may provide information about the contributor, such as the contributor's name, birthdate, social security number, user ID and passcode or other login credentials, contact information such as a phone number or email address, contributor's title in the project team (if any), status as a project manager or project supervisor and any other information about the contributor that may be deemed relevant for tracking a contributor by a person skilled in the art.

In step 603, the collaboration tracking systems described above, which may include computer systems 101 configured with hardware, software program code loaded in the memory of the computer system 101 or a combination thereof, may continuously store and retrieve data about the contributor as the contributor uses computer systems 101 of the collaboration tracking system. For example, in some embodiments, the collaboration tracking systems may build the amount of information associated with the contributor's profile created in step 601 by continuously compiling input data and historical data from one or more data sources accessed by the contributor in step 603 and saving the collected data to the contributor profile in step 605.

Input data may be compiled, collected and stored by the computer system 101. For instance, the I/O interface 120 may be connected to one or more input devices, such as a mouse or keyboard. As the contributor interacts with the input devices connected to computer system 101, the computer system may track and store information about the contributor interaction with the input devices. The input data collected may include keystrokes which may be parsed by the computer system's 101 analytics module 109 for keywords and/or track mouse movements. The input data may include information or metadata about the input data entered by the contributor into the computer system, such as search queries, programs opened, website links accessed, messages entered into the system, etc. In step 605, the input data collected by the computer system 101 may be stored in a data repository 115 which may be located on the computer system locally, or the input data may be stored on a network repository 325, which may be accessible to one or more nodes of the network 307.

Whereas input data may refer to an contributor's manipulation and actions directed toward an input device remotely or wirelessly connected to a computer system 101 of a collaboration tracking system, historical data may include data sources that may describe a contributor's interaction with a plurality of programs, services, and logs, etc. For instance, historical data that may be saved by the computer system to a contributor's profile may include web browsing habits, email messages, messaging service data, video streams, programs, database sets, social media feeds, search queries, network logs cataloging a contributor's usage of a network, or any other source of local or network accessible data sources that may provide information about an contributor's interaction with data accessible to the contributor.

The collection and storage of input data and historical data may be important for providing context and clues to the collaboration tracking system regarding the contributor's changes in location, which may help the system to make more accurate predictions based on input and historical data of one or more contributors who may eventually meet and collaborate. The input data and historical data may be project-related data, non-project related data, or a combination of both. The timing of the input data and historical data may indicate whether contributors crossing paths at a location sensor is consistent with a collaboration of a project related topic, and may further assist with predicting whether or not the interaction between contributors resulted in a project-related collaboration. For example, if two contributors, based on their input data and historical data are searching for a common project-related topics and the contributors cross paths at a common location, it is highly possible that the topic of their common project-related topic may come up in conversation. Likewise, in another example, if historical data suggests that two or more contributors recently sent a message or email stating they should discuss the project-related topic further or face to face the next time they see each other, and it is later determined that each of the contributors are in the same location, it may be highly likely that the project-related topic was discussed.

Location data may be introduced and received by the collaboration tracking system in conjunction with the historical data and/or input data. In step 607, the collaboration tracking system may check whether or not a contributor is within the proximity of a location sensor 103. The determination of location may be performed by a computer system associated with the contributor transmitting a signal receivable by the location sensor. As the computer system enters a zone proximate to the location sensor, the location sensor may be in range of receiving the signal being transmitted by the computer system's transceiver. If the computer system is within a connectable area to the location sensor, the method may proceed to step 609, wherein the computer system receives location data from the location sensor and saves the location data to the contributor's profile, a data repository, network repository or a combination thereof. If however, in step 607 it is determined that the computer system of the collaboration tracking system is not within the proximity of a location sensor, the collaboration tracking system may continue to compile contributor input data and historical data from the plurality of data sources available. In some embodiments, even if the method moves to step 609, the collaboration tracking system may continue to compile contributor data from input data and historical data simultaneously as the method continues to be performed.

Once it has been determined in step 607 that a contributor is within the proximate range of a location sensor, the collaboration tracking system may continue to track the proximity of the contributor to the location sensor in order to identify when a contributor has left the area surrounding the location sensor. In step 611, the collaboration tracking system may perform a status check of the contributor's location to determine if the location of the contributor has changed position. The status check may be continuous so long as the computer system of the contributor is continuously transmitting a signal to the location sensor in some embodiments. In other embodiments, the location sensor may periodically scan the area to check whether an contributor's computer system is still emitting a signal identifying the computer system within the proximate area of the location sensor. In some embodiments, if the location of the computer system, and thus the contributor has not changed location in step 611, the method may move back to step 609, updating the location data received from the location sensor and save the updated location data to the contributor's profile.

If, in step 611 it is determined by the collaboration tracking system that the contributor has changed locations by leaving the proximate area of coverage by a location sensor, two simultaneous or near simultaneous actions may occur. First, the collaboration tracking system may perform step 607 again, allowing for the collaboration tracking system to identify whether or not the contributor has entered the proximate location of a second location sensor. Table 1 provided below provides an example of a collaboration tracking system recording the positions of multiple contributor computer systems communicating the location of the contributors with the location sensors of the collaboration tracking system as the contributors change locations multiple times:

TABLE 1

Contributor Location Data

|    | John   | Susan  | Leslie |
|----|--------|--------|--------|
| 0  | DESK   | DESK   | DESK   |
| 5  |        | COOLER |        |
| 10 | COOLER |        | COOLER |
| 15 | DESK   | DESK   | DESK   |
| 20 | TEA    |        | TEA    |
| 25 | DESK   | TEA    | DESK   |
| 30 |        | DESK   |        |
| 35 |        |        |        |
| 40 | LUNCH  |        |        |
| 45 |        | LUNCH  | LUNCH  |
| 50 |        |        | DESK   |
| 55 | DESK   | DESK   |        |
| 60 |        |        |        |
| 65 |        |        |        |
| 70 |        |        |        |
| 75 |        |        |        |

As observable by Table 1, in some embodiments, the location data being stored may be tracking multiple contributors to a project, for example John, Susan and Leslie. The location sensor may also track the location of each project team member according to the location sensor the contributor is proximate to and the length of time a particular contributor remains in the coverage area of the location sensor.

In some embodiments, even as the contributor continues to move and change locations, the collaboration tracking method may proceed to analyze the location data, historical data and the location data being saved by the collaboration tracking system. In some embodiments, the analytics of the location data, historical data and location data may continuously adjust the predictions made by the collaboration tracking system, as new and updated location data, input data and historical data is received by the computer systems of the collaboration tracking system.

In step 613 the computer system of the collaboration tracking system, computer system, via the analytics module in some embodiments, may compare the location data received from the location sensor for each contributor of the project team, along with the input data and historical data. Using the location data, input data and historical data, the analytics module of the computer system may analyze all of the data to identify an identifiable pattern of each contributors' behavior as a function of the input data, location data and historical data. Using the computer systems pattern recognition to draw conclusions, the collaboration tracking system in step 613 may generate a probability that one or more contributors of the project team collaborated about project-related topics as they met in common locations throughout the day or project cycle. The probability may be generated as a function of the input data, location data and historical data.

For example, if two or more contributors are researching a common project-related topic for an extended period of time, communicating over a messenger service and/or emails about said project-related topic, and the contributors are in a common location with one another, despite not formalizing the meeting or perhaps crossing paths merely by chance, it is highly possible that the project-related topic may have been discussed, at least in part. However, if two contributors to a project cross paths at a particular time but the input data and historical data collected on each contributor suggests that the contributors are not part of the same project team or collaborating project teams or contribute to projects having similar subject matter and neither contributor was recently researching a project related topic that may be of interest to the other contributor, the computer system may determine that the probability of an off the record collaboration occurring between the contributors may be a very low probability. Accordingly, in step 617, the probability of the project-collaboration may be reported to the computing systems of the collaboration tracking system, a project manager for each of the contributors being tracked or a particular program which may record accredit the contributors for spontaneous, unrecorded collaborations with other contributors of the project team regarding project-related topics, if the probability of such a project-related collaboration is determined to be higher than a programmed threshold set by the collaboration tracking system.

In an alternative method 700, the project collaboration system may implement steps to record and confirm that the collaborations occurring between contributors at various locations are indeed directed toward project-related topics, using cameras, video capturing devices, microphones and/or image and recording software to record moments of collaboration between contributors. In the embodiment of method 700, the steps 701, 703, 705, 707, 709, 713 and 715 may be identical or analogous to steps 601, 603, 605, 607, 609, 613 and 615 as previously described above.

Continuing from step 715, wherein the probability of a project-related collaboration between multiple contributors is generated as a function of the input data, historical data and location data saved to each contributor profile, the method may continue in step 712 by making a determination of whether or not the probability generated in step 715 is higher than a preset value of probability. If, in step 712, the probability generated by the analytics module as a function of the input data, historical data and location data, is lower than the pre-set value, the method may return to step 703 and update the input, historical and location data and make the probability calculation again. However, if in step 712 it is determined that the probability generated in step 715 is greater than a pre-set value, the collaboration tracking system may signal for an audio or video recording device located at the site of the location sensor or computer systems of the contributors to initiate and record collaboration data in order to confirm in step 716 that the collaboration between each of the collaborators was directed toward a project-related topic. The step of confirming the content of the collaboration in step 716 may be performed manually by an individual collaborator or project team member tasked with reviewing the audio or video recordings of the collaboration conversation between collaborators. In the exemplary embodiment, the analytics module of the collaboration tracking system may actively parse or review the recordings made by the collaboration tracking system for project-related content. In step 717, the collaboration tracking system may report the confirmation of the project-related collaboration to a project-manager or other project team members who may interested in the collaboration and the most up to date information regarding the project. Moreover, in some embodiments, the collaboration tracking system may report and/or store a copy of the collaboration to each participating contributors' profile and/or store a copy in a location accessible by one or more members of the project team.

Computer System

Figure 7:
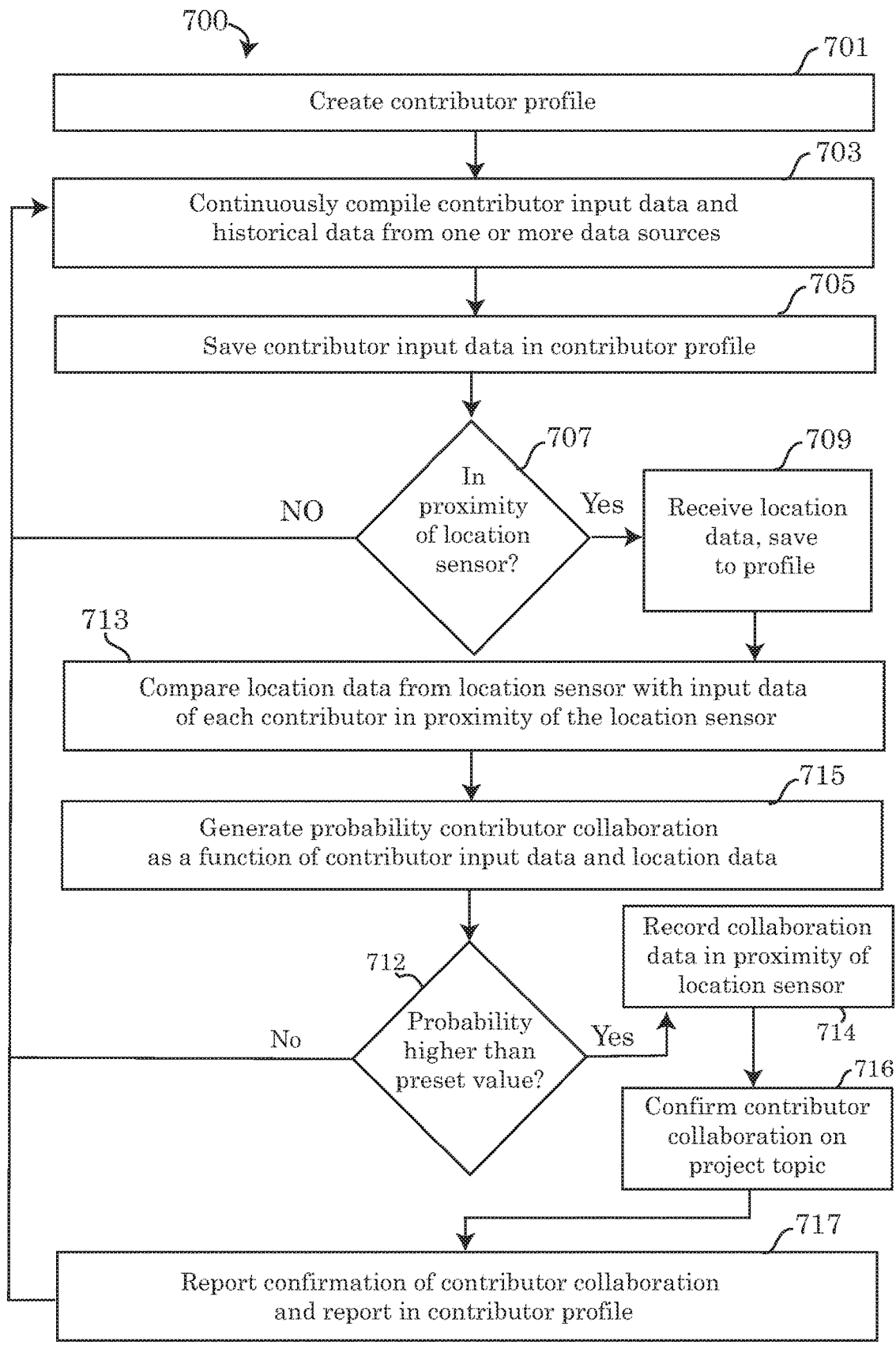
FIG. 7 depicts a flowchart of an alternative embodiment of an algorithm capable of implementing methods of tracking collaborations between contributors to a project consistent with embodiments of the present disclosure.
Figure 8:
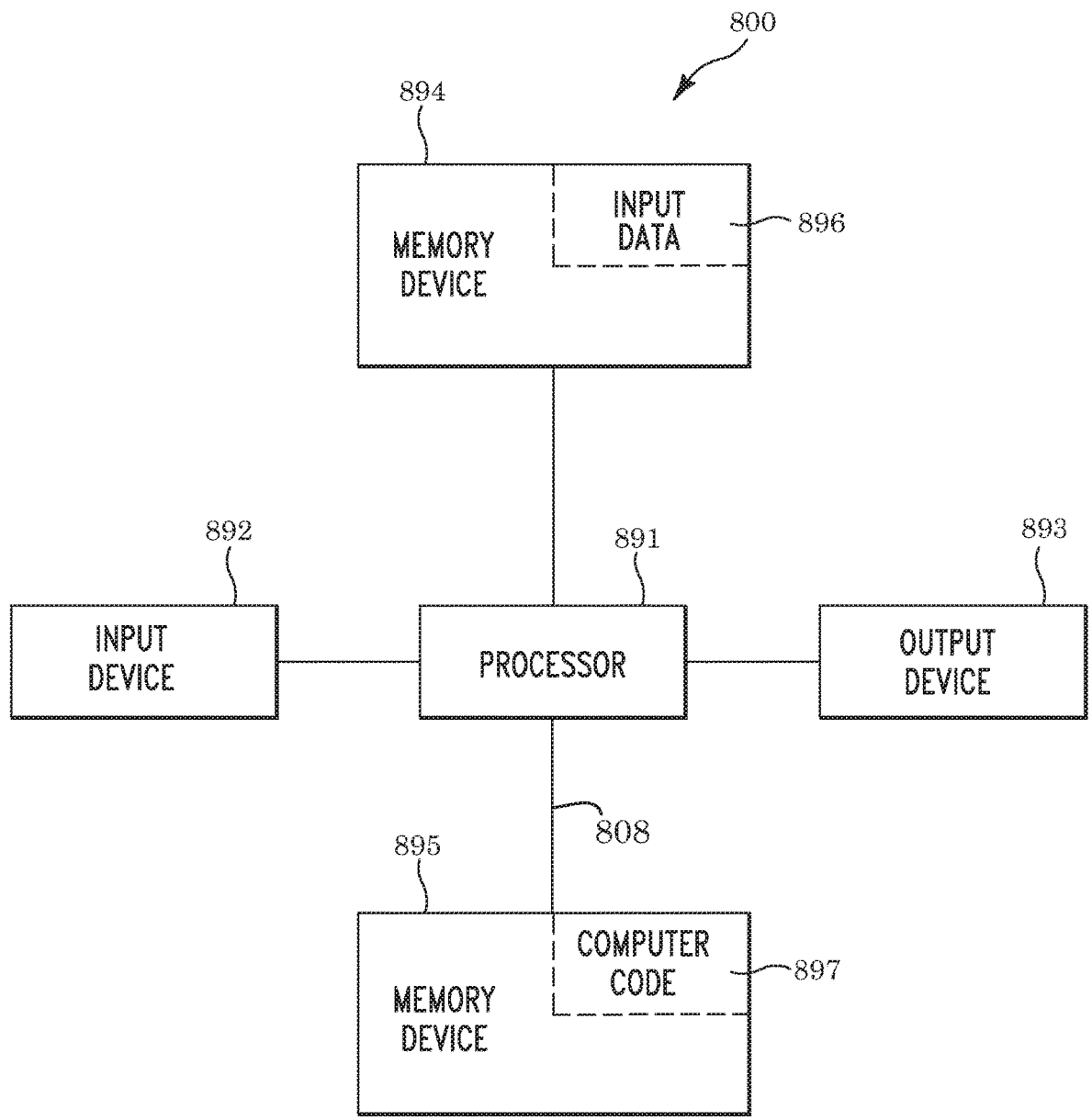
FIG. 8 illustrates a block diagram of an embodiment of a computer system capable of implementing the collaboration tracking tools, methods and systems consistent with embodiments of the present disclosure.

Referring to the drawings, FIG. 8 illustrates a block diagram of a computer system 800 that may be included in the system of FIGS. 1-5 and for implementing the methods of FIGS. 6-7, in accordance with the embodiments of the present disclosure. The computer system 800 may generally comprise a processor 891, an input device 892 coupled to the processor 891, an output device 893 coupled to the processor 891, and memory devices 894 and 895 each coupled to the processor 891. The input device 892, output device 893 and memory devices 894, 895 may each be coupled to the processor 891 via bus 808. Processor 891 may perform computations and control the functions of computer 800, including executing instructions included in the computer code 897 for the collaboration tools and programs capable of implementing a method for tracking work-related collaborations between one or more users occurring in a non-computing environment, in the manner prescribed by the embodiments of FIGS. 6-7 using the systems of FIGS. 1-5, wherein the instructions of the computer code 897 may be executed by processor 891 via memory device 895. The computer code 897 may include software or program instructions that may implement one or more algorithms for implementing the methods of tracking work-related collaborations between multiple user outside of the computing environment, as described in detail above. The processor 891 executes the computer code 897. Processor 891 may include a single processing unit, or may be distributed across one or more processing units in one or more locations (e.g., on a client and server).

The memory device 894 may include input data 896. The input data 896 includes any inputs required by the computer code 897. The output device 893 displays output from the computer code 897. Either or both memory devices 894 and 895 may be used as a computer usable storage medium (or program storage device) having a computer readable program embodied therein and/or having other data stored therein, wherein the computer readable program comprises the computer code 897. Generally, a computer program product (or, alternatively, an article of manufacture) of the computer system 800 may comprise said computer usable storage medium (or said program storage device).

Memory devices 894, 895 includes a known computer readable storage medium, including those described in detail below. In one embodiment, cache memory elements of memory devices 894, 895 may provide temporary storage of at least some program code (e.g., computer code 897) in order to reduce the number of times code must be retrieved from bulk storage while instructions of the computer code 897 are executed. Moreover, similar to processor 891, memory devices 894, 895 may reside at a single physical location, including one or more types of data storage, or be distributed across a plurality of physical systems in various forms. Further, memory devices 894, 895 can include data distributed across, for example, a local area network (LAN) or a wide area network (WAN). Further, memory devices 894, 895 may include an operating system (not shown) and may include other systems not shown in FIG. 8.

In some embodiments, the computer system 800 may further be coupled to an Input/output (I/O) interface and a computer data storage unit. An I/O interface may include any system for exchanging information to or from an input device 892 or output device 893. The input device 892 may be, inter alia, a keyboard, a mouse, etc. The output device 893 may be, inter alia, a printer, a plotter, a display device (such as a computer screen), a magnetic tape, a removable hard disk, a floppy disk, etc. The memory devices 894 and 895 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus 808 may provide a communication link between each of the components in computer 800, and may include any type of transmission link, including electrical, optical, wireless, etc.

An I/O interface may allow computer system 800 to store information (e.g., data or program instructions such as program code 897) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a data repository as shown in FIGS. 1-5.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to user monitoring and tracking collaboration between one or more users in a non-computing environment. Thus, an embodiment of the present invention discloses a process for supporting computer infrastructure, where the process includes providing at least one support service for at least one of integrating, hosting, maintaining and deploying computer-readable code (e.g., program code 897) in a computer system (e.g., computer 800) including one or more processor(s) 891, wherein the processor(s) carry out instructions contained in the computer code 897 causing the computer system to monitor user interactions and track collaborations between one or more users occurring in a non-computing environment. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method of monitoring user interactions to track collaborations between one or more user's in a non-computing environment. Thus the present invention discloses a process for supporting, deploying and/or integrating computer infrastructure, integrating, hosting, maintaining, and deploying computer-readable code into the computer system 800, wherein the code in combination with the computer system 800 is capable of performing a method for monitoring user interactions to track collaborations between one or more user's in a non-computing environment.

A computer program product of the present invention comprises one or more computer readable hardware storage devices having computer readable program code stored therein, said program code containing instructions executable by one or more processors of a computer system to implement the methods of the present invention.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for tracking undocumented collaboration between contributors of a project comprising the steps of:
   receiving, by a computer processor, location data from a location sensor, the location data including location information of a plurality of project-associated computing systems communicating with the location sensor;
   compiling, by the computer processor, contributor input data stored by one or more data sources receiving the input data via an input/output (I/O) interface;
   comparing, by the computer processor, the location data and contributor input data of each of the plurality of project-associated computing systems communicating with the location sensor;
   generating, by the computer processor, a probability that a plurality of contributors associated with each respective project-associated computing systems, are discussing a project-related topic, the probability being generated as a function of each contributor's location data and contributor input data;
   ascertaining, by the computer processor, that the generated probability exceeds a preset value of probability; and
   in response to said ascertaining and to confirmation of the undocumented collaboration between contributors of the project, reporting, by the computer processor, the undocumented collaboration between contributors of the project.

2. The method of claim 1, wherein the location sensor is a global positioning system (GPS) satellite and the location data includes GPS location and time information.

3. The method of claim 1, wherein the location sensor is an RFID tag, a wireless transmission protocol beacon, or a Wi-Fi beacon.

4. The method of claim 1, wherein the data sources are a social media feed, a browser history, a data log, a search query or a keystroke log.

5. The method of claim 1, further comprising the step of:
   creating, by the computer processor, a profile for each contributor;
   storing, by the computer processor, a history of location data and input data; and
   analyzing, by the computer processor, an identifiable pattern of contributor behavior as a function of the location data and input data, wherein an occurrence of the identifiable pattern of contributor behavior increases the probability of successfully predicting, by the computer processor, an incidence of the undocumented collaboration by the contributors on a project-related topic.

6. The method of claim 5, further comprising the steps of:
   recording, by the computer processor, video data of the undocumented collaboration by the contributors of the project;
   storing the video data in the profile of each contributor recorded during the recording step; and confirming, by the computer processor, the video data of the recording step includes discussion of the project-related topic.

7. The method of claim 1, further comprising providing at least one support service for at least one of creating, integrating, hosting, maintaining, and deploying computer-readable program code in a computer system, where the computer-readable program code in combination with the computer system is configured to implement the steps of receiving, compiling, comparing, generating and reporting.

8. A computer program product, comprising:
one or more computer readable hardware storage devices having computer readable program code stored therein, said program code containing instructions executable by the one or more computer processors to implement a method for tracking undocumented collaboration by contributors to a project comprising the steps of:
receiving, by a computer processor, location data from a location sensor, the location data including location information of a plurality of project-associated computing systems communicating with the location sensor;
compiling, by the computer processor, contributor input data stored by one or more data sources receiving the input data via an input/output (I/O) interface;
comparing, by the computer processor, the location data and contributor input data of each of the plurality of project-associated computing systems communicating with the location sensor;
generating, by the computer processor, a probability that a plurality of contributors associated with each respective project-associated computing systems, are discussing a project-related topic, the probability being generated as a function of each contributor's location data and contributor input data;
ascertaining, by the computer processor, that the generated probability exceeds a preset value of probability; and
in response to said ascertaining and to confirmation of the undocumented collaboration between contributors of the project, reporting, by the computer processor, the undocumented collaboration between contributors of the project.

9. The computer program product of claim 8, wherein the location sensor is a global positioning system (GPS) satellite and the location data includes GPS location and time information.

10. The computer program product of claim 8, wherein the location sensor is an RFID tag, a wireless transmission protocol beacon, or a Wi-Fi beacon.

11. The computer program product of claim 8, wherein the data sources are a social media feed, a browser history, a data log, a search query or a keystroke log.

12. The computer program product of claim 8, further comprising the step of:
creating, by the computer processor, a profile for each contributor;
storing, by the computer processor, a history of location data and input data; and
analyzing, by the computer processor, an identifiable pattern of contributor behavior as a function of the location data and input data, wherein an occurrence of the identifiable pattern of contributor behavior increases the probability of successfully predicting, by the computer processor, an incidence of the undocumented collaboration by the contributors on a project-related topic.

13. The computer program product of claim 12, further comprising the steps of:
recording, by the computer processor, video data of the undocumented collaboration of the project;
storing the video data in the profile of each contributor recorded during the recording step; and
confirming, by the computer processor, the video data of the recording step includes discussion of the project-related topic.

14. A computer system, comprising:
a processor;
a memory device coupled to the processor; and
a computer readable storage device coupled to the processor, wherein the storage device contains program code executable by the processor via the memory device to implement a method for tracking undocumented collaboration between contributors to a project comprising the steps of:
receiving, by a computer processor, location data from a location sensor, the location data including location information of a plurality of project-associated computing systems communicating with the location sensor;
compiling, by the computer processor, contributor input data stored by one or more data sources receiving the input data via an input/output (I/O) interface;
comparing, by the computer processor, the location data and contributor input data of each of the plurality of project-associated computing systems communicating with the location sensor;
generating, by the computer processor, a probability that a plurality of contributors associated with each respective project-associated computing systems, are discussing a project-related topic, the probability being generated as a function of each contributor's location data and contributor input data;
ascertaining, by the computer processor, that the generated probability exceeds a preset value of probability; and
in response to said ascertaining and to confirmation of the undocumented collaboration between contributors of the project, reporting, by the computer processor, the undocumented collaboration between contributors of the project.

15. The computer system of claim 14, wherein the computer system further comprises a global positioning system (GPS) module coupled to the processor, the location sensor is a GPS satellite and the location data being received by the processor includes GPS location and time information.

16. The computer system of claim 14, wherein the computer system further comprises:
a location retrieval module coupled to the processor, wherein the location retrieval module is a wireless transmission protocol module, a RFID module or a Wi-Fi module; and
a location transceiver coupled to the processor, wherein the location transceiver is a wireless transmission protocol antenna, a RFID transceiver or a Wi-Fi antenna, wherein the location sensor is an RFID tag, a wireless transmission protocol beacon, or a Wi-Fi beacon.

17. The computer system of claim 14, wherein the data sources are a social media feed, a browser history, a data log, a search query or a keystroke log.

18. The computer system of claim 14, further comprising the step of:
creating, by the computer processor, a profile for each contributor;

storing, by the computer processor, a history of location data and input data; and analyzing, by the computer processor, an identifiable pattern of contributor behavior as a function of the location data and input data, wherein an occurrence of the identifiable pattern of contributor behavior increases the probability of successfully predicting, by the computer processor, an incidence of the undocumented collaboration by the contributors on a project-related topic.

19. The computer system of claim 18, further comprising the steps of:

recording, by the computer processor, video data of the undocumented collaboration of the project;

storing the video data in the profile of each contributor recorded during the recording step; and confirming, by the computer processor, the video data of the recording step includes discussion of the project-related topic.

20. The computer system of claim 14, further comprising a location transmitter wirelessly coupled to the location sensor, wherein the location transmitter provides location data of each contributor within a proximity to the location sensor.

* * * * *